United States Patent
Konaka

(10) Patent No.: US 7,606,553 B2
(45) Date of Patent: Oct. 20, 2009

(54) INFORMATION PROCESSING APPARATUS WITH ANTENNA SWITCHING FUNCTION, COMMUNICATION APPARATUS, ANTENNA SWITCHING CONTROL UNIT AND COMPUTER-READABLE RECORDING MEDIUM RECORDING ANTENNA SWITCHING CONTROL PROGRAM

(75) Inventor: Yosuke Konaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 311 days.

(21) Appl. No.: 11/249,368

(22) Filed: Oct. 14, 2005

(65) Prior Publication Data

US 2006/0030278 A1    Feb. 9, 2006

Related U.S. Application Data

(63) Continuation of application No. PCT/JP03/04896, filed on Apr. 17, 2003.

(51) Int. Cl.
*H04B 7/02* (2006.01)
*H04M 1/00* (2006.01)

(52) U.S. Cl. .................. 455/403; 455/78; 455/101; 455/272; 455/562.1

(58) Field of Classification Search .......... 455/78, 455/552.1–553, 556.1–556.2, 575.7, 101, 455/132, 140, 272–277.2
See application file for complete search history.

(56) References Cited

U.S. PATENT DOCUMENTS

| | | | |
|---|---|---|---|
| 5,557,603 A | 9/1996 | Barlett et al. | 370/16 |
| 5,715,525 A | 2/1998 | Tarusawa et al. | 455/101 |
| 6,560,443 B1 * | 5/2003 | Vaisanen et al. | 455/73 |
| 6,978,121 B1 * | 12/2005 | Lane et al. | 455/73 |
| 7,046,649 B2 * | 5/2006 | Awater et al. | 370/338 |
| 7,340,236 B2 * | 3/2008 | Liang et al. | 455/277.2 |
| 2002/0102950 A1 | 8/2002 | Gore et al. | |

(Continued)

FOREIGN PATENT DOCUMENTS

CN    1404291    3/2003

(Continued)

OTHER PUBLICATIONS

Supplementary European Search Report issued in corresponding European Patent Application No. 03717631.0, on Apr. 11, 2008.

(Continued)

*Primary Examiner*—Simon D Nguyen
(74) *Attorney, Agent, or Firm*—Staas & Halsey LLP

(57) ABSTRACT

In an information processing apparatus such as a notebook type personal computer having radio communication functions, for communication units to simultaneously carry out transmission/reception independently of each other without increasing the number of antennas, and for sufficiently utilizing a diversity function in the case of only a portion of the communication units, there are provided antennas, communication units capable of carrying out radio communications through the use of the antennas, respectively, and a switching unit for switching connection states between the antennas and the communication units. When radio communications are simultaneously made through the use of all the communication units, the switching unit establishes connections between the communication units and the antennas while, when radio communication is made through the use of the communication unit, the switching unit connects the antennas, the number of which depends on communication modes of the communication unit, with this communication unit.

10 Claims, 8 Drawing Sheets

U.S. PATENT DOCUMENTS

| | | | |
|---|---|---|---|
| 2002/0137472 A1* | 9/2002 | Quinn et al. | 455/90 |
| 2002/0183032 A1* | 12/2002 | Fang | 455/280 |
| 2003/0003881 A1 | 1/2003 | Anim-Appiah et al. | |
| 2003/0050032 A1 | 3/2003 | Masaki | |
| 2004/0092285 A1* | 5/2004 | Kodim | 455/552.1 |

FOREIGN PATENT DOCUMENTS

| | | |
|---|---|---|
| EP | 0619054 | 8/1995 |
| EP | 0751631 A1 | 1/1997 |
| EP | 1 294 048 | 3/2003 |
| JP | 55-97746 | 7/1980 |
| JP | 58-191537 | 11/1983 |
| JP | 5-102879 | 4/1993 |
| JP | 7-502391 | 3/1995 |
| JP | 9-18397 | 1/1997 |
| JP | 9-116458 | 5/1997 |
| JP | 10-13387 | 1/1998 |
| JP | 10-229359 | 8/1998 |
| JP | 11-88245 | 3/1999 |
| JP | 2000-91970 | 3/2000 |
| JP | 2001-24579 | 1/2001 |
| JP | 2001-177870 | 6/2001 |
| JP | 2002-73210 | 3/2002 |
| JP | 2002-353826 | 12/2002 |
| WO | WO 93/13605 | 7/1993 |
| WO | 00/51264 | 8/2000 |

OTHER PUBLICATIONS

Japanese Patent Office Action, mailed May 13, 2008 and issued in corresponding Japanese Patent Application No. 2004-570898.

U.S. Appl. No. 12/099,398, filed Apr. 8, 2008, Konaka et al.

Chinese Patent Office Action, mailed Sep. 12, 2008 and issued in corresponding Chinese Patent Application No. 038263076.

Japanese Patent Office Action, mailed Sep. 2, 2008 and issued in corresponding Japanese Patent Application No. 2004-570898.

* cited by examiner

INFORMATION PROCESSING APPARATUS WITH ANTENNA SWITCHING FUNCTION, COMMUNICATION APPARATUS, ANTENNA SWITCHING CONTROL UNIT AND COMPUTER-READABLE RECORDING MEDIUM RECORDING ANTENNA SWITCHING CONTROL PROGRAM

This application is a continuation application, filed under 35 USC 111(a),of international Application PCT/JP2003/ 004896, filed Apr. 17, 2003.

FIELD OF THE INVENTION

The present invention relates to a technique suitable for use in information processing apparatus such as a notebook type personal computer having a plurality of radio communication functions [for example, Bluetooth (registered trademark) and radio LAN (Wireless Local Area Network; W-LAN)].

DESCRIPTION OF THE RELATED ART

In general, in a case in which a radio communication apparatus or the like is equipped with a plurality of communication units having different communication modes, each of antennas is provided for each communication unit and the plurality of communication units are made to simultaneously carry out the transmission/reception independently of each other, or the plurality of communication units are made to share one set of antennas and only one communication unit to be put to use is connected to the antennas (for example, the following patent document 1 and the following patent document 2). In the case of the latter method, difficulty is experienced in making the plurality of communication units simultaneously carry out the transmission/reception independently of each other.

Furthermore, in the recent years, a portable information processing apparatus, for example a notebook type personal computer (sometimes hereinafter to as a notebook personal computer) may be equipped with radio LAN (2.4-GHz band) having a two-antenna diversity function as a radio communication function. In the case of the radio LAN communication function, for a high radiation characteristic, for example, as shown in FIG. 6, two antennas 101 and 102 are internally placed at a position keeping a satisfactory line-of-sight distance from the apparatus, concretely, on both the right and left sides of an upper portion of a display unit [LCD (Liquid Crystal Panel) panel] 100a of a notebook personal computer 100. The notebook personal computer 100 shown in FIG. 6 has two housings (display unit 100a including a display panel and a main body 100b including a keyboard and others), and these housings are connected through a hinge (not shown) to each other to be rotatable so that the notebook personal computer 100 is foldable owing to the hinge.

Still furthermore, in the recent years, it is desirable that, in addition to the radio communication function, the notebook personal computer has the Bluetooth (2.4-GHz band). For the radio LAN communication function having the two-antenna diversity function and the Bluetooth communication function to be used independently of each other, there is a need to prepare an antenna for the radio LAN and an antenna for the Bluetooth separately. That is, there is a need to prepare three antennas independently in the notebook personal computer.

In a case in which, in the notebook personal computer 100, an antenna 103 for the Blue tooth is further provided in addition to the radio LAN antennas 101 and 102, it can be considered to employ a method in which the antenna 103 internally disposed at an intermediate position between the antennas 101 and 102 in an upper portion of the display unit 100a of the personal computer 100 as shown in FIG. 7 and a method in which the antenna 103 is internally provided in the main body 100b side of the personal computer 100 as shown in FIG. 8.

In this connection, the following patent documents 3 and 4 disclose a common diversity communication function to be used for a radio communication apparatus in a base station or the like instead of a portable information processing apparatus.

Meanwhile, for obtaining the effects of the diversity function effectively, as shown in FIGS. 6 to 8, there is a need to locate the radio LAN antennas 101 and 102 having the diversity function in areas having a high reception efficiency in a state separated from each other. In FIGS. 6 to 8, the distance between the antennas 101 and 102 is indicated by L2.

Moreover, the location where the Bluetooth antenna 103 is mountable is limited to the interior of a housing of the notebook personal computer 100 and, for attaining a high reception efficiency and an excellent antenna radiation characteristic, as shown in FIG. 7, usually, it is considered that an upper portion of the display unit 100a is appropriate, because it can make an excellent line-of sight distance from the apparatus. Incidentally, the Bluetooth and the radio LAN use the same frequency band (2.4-GHz band) and sometimes carry out the communication operations at the same time.

In a case in which the physical distance L1 among the antennas 101 to 103 is short, an electric wave emitted from the Bluetooth antenna 103 are intensively received by the radio LAN antennas 101 and 102. In this case, noises appears in the radio LAN communication apparatus, and, with respect to a signal to be actually received by the radio LAN communication apparatus, the signal/noise ratio deteriorate, which can considerably degrade the communication performance.

The prevention of such considerable degradation of the communication performance requires at least a distance of about 20 cm between the radio LAN antennas 101, 102 and the Bluetooth antenna 103. However, the width of a common notebook personal computer depends upon the width of an LCD panel in the display unit 100a and is approximately 25 cm.

Accordingly, for putting two types of radio apparatuses in a notebook personal computer within this determined width while preventing the degradation of the signal/noise ratio, only two antennas can be built in an upper portion of the LCD panel.

In a case in which each of the two types of radio apparatuses occupies the two antennas, the radio LAN communication apparatus cannot use the diversity function, and the communication performance of the radio LAN communication apparatus extremely deteriorates according to reception environments.

Moreover, as shown in FIG. 8, in a case in which the Bluetooth antenna 103 is internally provided in the main body 100b side of the notebook personal computer 100, although the physical distance L1 which can prevent the considerable degradation of the communication performance is securable between the antenna 103 and the radio LAN antenna 102, when the notebook personal computer 100 is put on a desk, the Bluetooth antenna 103 cannot exhibit a sufficient communication performance (communication distance) because it receives a great influence of the material of the desk. In particular, in the case of a notebook personal computer of a type brought into various places for use, the thickness reduction of the apparatus is desirable and, in most cases, the main body 100b is designed to have a small thickness. Therefore, in the case of this type of notebook personal computer, this influence becomes noticeable when the antenna 103 is internally provided in the main body 100*b*, which practically makes it difficult to mount the antenna 103 in the main body 100*b*. In FIG. 8, the distance between the antenna 103 and the desk is indicated by h1.

As mentioned above, for making the plurality of communication units simultaneously carry out the transmission/reception independently of each other, usually, there is a need to prepare each of antennas independently for each communication unit and, for example, in the case of an apparatus equipped with the Bluetooth and a radio LAN having a diversity function, at least three antennas become necessary. That is, in the case of the employment of the radio communication function having the diversity function, the number of antennas is larger than the number of communication units (communication modes) of the apparatus.

However, as mentioned above with reference to FIGS. 7 and 8, for the antennas to exhibit an excellent radiation characteristic, the place where the antennas can be located/mounted is extremely limited in the interior of the housing of the apparatus, and an increase in the number of antennas is extremely demeritorious for the size reduction of an information processing apparatus such as a notebook personal computer.

The present invention has been developed in consideration of these situations, and it is an object of the invention to, in a case in which a communication unit based on a different communication mode is provided in addition to a communication unit having, for example, a diversity function, making a plurality of communication units simultaneously carry out the transmission/reception independently of each other without increasing the number of antennas (for example, while equalizing the number of communication units with the number of antennas) and further to utilize the diversity function sufficiently when a portion of the communication units are not put to use. A further object thereof is to realize the size reduction of an apparatus having a plurality of radio communication functions.

Patent Document 1
Japanese Patent Laid-Open No. HEI 9-18397
Patent Document 2
Japanese Patent Laid-Open No. HEI 9-116458
Patent Document 3
Japanese Patent Laid-Open No. HEI 10-229359
Patent Document 4
Japanese Patent Laid-Open No. 2000-91970

SUMMARY OF THE INVENTION

For achieving the above-mentioned purposes, an information processing apparatus with an antenna switching function according to the present invention is characterized by comprising a plurality of antennas, a plurality of communication units each made to carry out a radio communication and a switching unit made to switch connection states between the plurality of antennas and the plurality of communication units, when radio communications are simultaneously made through the use of the plurality of communication units, the switching unit making connections between the plurality of communication units and the plurality of antennas and, when radio communications are made through the use of a portion of the plurality of communication units, making connections between the antennas, the number of which depends on communication modes of the communication units made to carry out the radio communications, and these communication units.

In addition, an information processing apparatus with an antenna switching function according to the present invention is characterized by comprising a plurality of antennas, a plurality of communication units each made to carry out a radio communication, a switching unit made to switch connection states between the plurality of antennas and the plurality of communication units and a switching control unit for controlling the switching unit to switch the connection states, with at least one of the plurality of communication units having a diversity function whereby the plurality of antennas are controllable, and the switching control unit controlling the switching unit so that the antennas other than the antenna to be used by the communication unit having the diversity function are connected to the communication units other than this communication unit.

A communication apparatus with an antenna switching function according to the present invention comprises a plurality of antennas and a plurality of communication units each made to carry out a radio communication, and is characterized in that a switching unit is provided to switch connection states between the plurality of antennas and the plurality of communication units and, when the radio communications are simultaneously made through the use of the plurality of communication units, the switching unit makes connections between the plurality of communication units and the plurality of antennas and, when the radio communications are made through the use of a portion of the plurality of communication units, the switching unit makes connection between the antennas, the number of which depends on communication modes of the communication units made to carry out the radio communications, and these communication units.

Moreover, a communication apparatus with an antenna switching function according to the present invention comprises a plurality of antennas and a plurality of communication units each made to carry out a radio communication, and is characterized by further comprising a switching unit for switching connection states between the plurality of antennas and the plurality of communication units and a switching control unit for controlling the switching unit to switch the connection states, wherein at least one of the plurality of communication units has a diversity function whereby the plurality of antennas are controllable and the switching control unit controls the switching unit so that the antennas other than the antenna to be used by the communication unit having the diversity function are connected to the communication units other than this communication unit.

An antenna switching control unit according to the present invention, which is used for an apparatus comprising a plurality of antennas, a plurality of communication units each made to carry out a radio communication and a switching unit made to switch connection states between the plurality of antennas and the plurality of communication units and which is made to control the switching unit to switch the connection state, is characterized by controlling the switching unit so that, when the radio communications are simultaneously made through the use of the plurality of communication units, the switching unit makes connections between the plurality of communication units and the plurality of antennas and, when the radio communications are made through the use of a portion of the plurality of communication units, the switching unit makes connection between the antennas, the number of which depends on communication modes of the communication units made to carry out the radio communications, and these communication units.

Furthermore, an antenna switching control unit according to the present invention, which is used for an apparatus comprising a plurality of antennas, a plurality of communication units each made to carry out a radio communication and a switching unit made to switch connection states between the plurality of antennas and the plurality of communication units and which is made to control the switching unit to switch the connection states, is characterized by controlling the switching unit so that the antennas other than the antenna to be used by the communication unit having the diversity function whereby the plurality of antennas are controllable are connected to the communication units other than this communication unit.

An antenna switching control program according to the present invention, which makes a computer function as an antenna switching control unit to, in an apparatus comprising a plurality of antennas, a plurality of communication units each made to carry out a radio communication and a switching unit made to switch connection states between the plurality of antennas and the plurality of communication units, control the switching unit to switch the connection states, is characterized by making the computer control the switching unit so that, when the radio communications are simultaneously made through the use of the plurality of communication units, the switching unit makes connections between the plurality of communication units and the plurality of antennas and, when the radio communications are made through the use of a portion of the plurality of communication units, the switching unit makes connection between the antennas, the number of which depends on communication modes of the communication units made to carry out the radio communications, and these communication units.

In addition, an antenna switching control program according to the present invention, which makes a computer function as an antenna switching control unit to, in an apparatus comprising a plurality of antennas, a plurality of communication units each made to carry out a radio communication and a switching unit made to switch connection states between the plurality of antennas and the plurality of communication units, control the switching unit to switch the connection states, is characterized by making the computer control the switching unit so that the antennas other than the antenna to be used by the communication unit having the diversity function whereby the plurality of antennas are controllable are connected to the communication units other than this communication unit.

Furthermore, a computer-readable recording medium according to the present invention is for recording the above-mentioned antenna switching control programs.

According to the present invention described above, when radio communications are simultaneously made through the use of the plurality of communication units, the plurality of communication units and the plurality of antennas are connected to each other, and when the radio communications are made through the use of a portion of the plurality of communication units, the antennas, the number of which depends on a communication mode (for example, a radio LAN having a diversity function) of the communication units made to carry out the radio communication, are connected to these communication units. Therefore, in a case in which, for example, a communication unit according to a different communication mode (for example, Bluetooth) is provided in addition to the communication unit having the diversity function, the number of communication units is equalized with the number of antennas and, without increasing the number of antennas, the plurality of communication units can simultaneously carry out the transmissions/receptions independently of each other, and the sufficient utilization of the diversity function becomes feasible when a portion of the communication units are not put to use. Therefore, this can further realize a further size reduction of an apparatus (for example, information processing apparatus such as notebook personal computer) having a plurality of radio communication functions including radio LAN having the diversity function.

Moreover, the employment of the switching control unit (function obtained when a computer executes the antenna switching control program) enables the automatic control on the antenna switching condition and further enables the antenna switching (manual switching) according to switching instruction information inputted from an inputting device by an operator. In particular, in a case in which the operator inputs the switching instruction information, when a design is made such that the electric wave reception state in a communication unit which is using an antenna is offered to the operator, an antenna in use is preventable from being switched in error so that the communication falls into a disconnected state.

Still moreover, when the antennas other than the antenna used by the communication unit having the diversity function whereby a plurality of antennas are controllable are connected to the communication units other than that communication unit, an excellent radiation characteristic is securable at all times in the communication unit (for example, radio LAN) having the diversity function, and the other communication unit (for example, Bluetooth) can carry out the radio communication while preventing the degradation of the performance due to the deterioration of the communication quality.

Yet moreover, in a case in which the present invention is applied to a notebook personal computer in designed such that a display unit including a display panel, which is a movable-side housing, and a main body including a keyboard, which is a fixed-side housing, are rotabably connected to be foldable, when a plurality of antennas are internally provided in an upper portion of the display unit, the antennas are located at a high position which can make a satisfactory line-of-sight distance while the computer is in use. Accordingly, in a case in which, for example, the Bluetooth and a radio LAN having a two-antenna diversity function are employed as a communication mode, a sufficient physical distance is securable and, through the use of the two antennas built in the upper portion of the display unit, particularly at the use of the Bluetooth, a sufficient communication performance (communication distance) is attainable without receiving the influence of the material of a desk or the like while preventing the deterioration of the signal/noise ratio.

DESCRIPTION OF THE PREFERRED EMBODIMENTS

Embodiments of the present invention will be described hereinbelow with reference to the drawings.

[1] Description of First Embodiment

Figure 1:
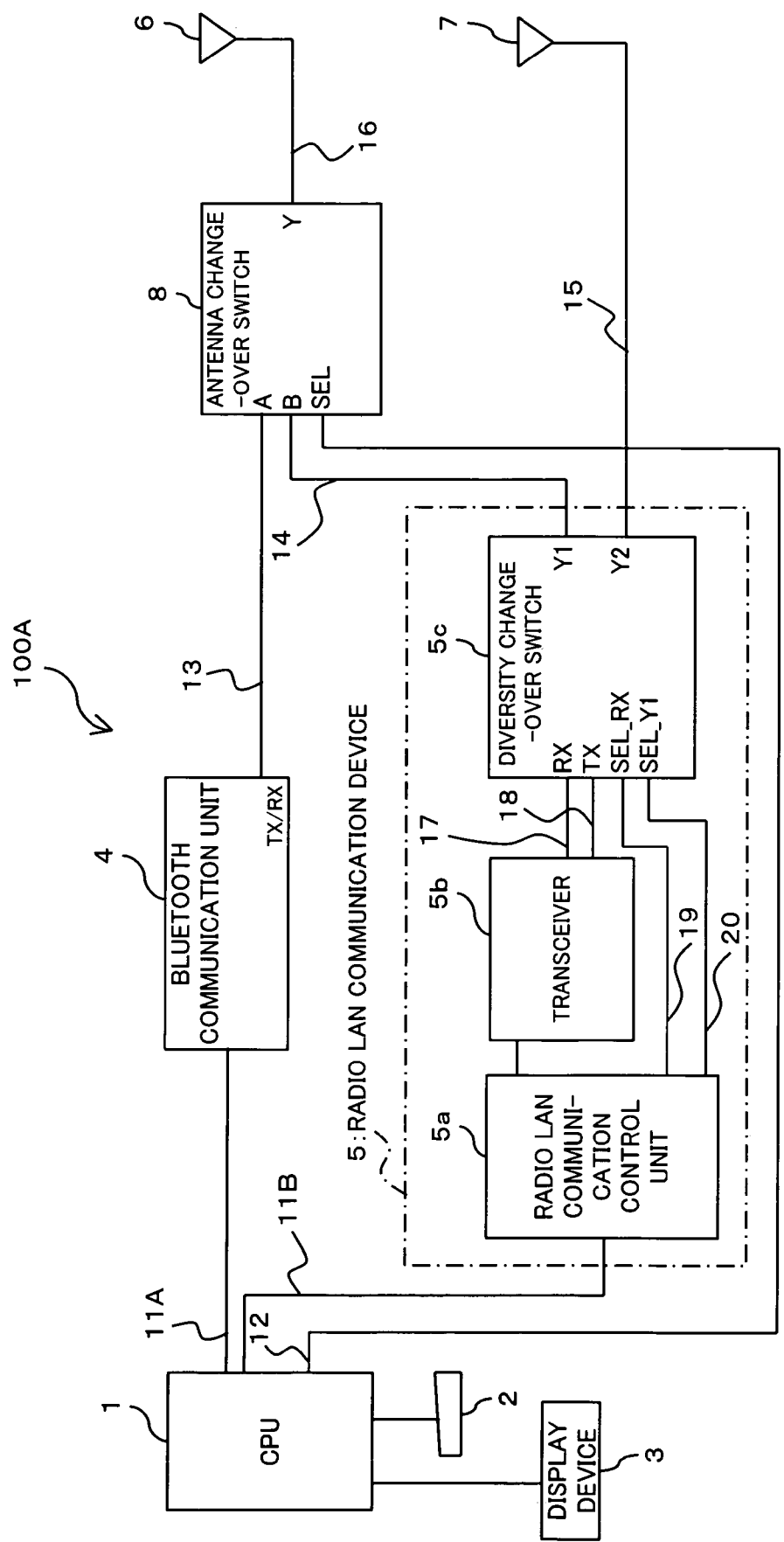
FIG. 1 is a block diagram showing a configuration of an information processing apparatus (communication apparatus) having an antenna switching function according to a first embodiment of the present invention.

FIG. 1 is a block diagram showing a configuration of an information processing apparatus having an antenna switching function according to a first embodiment of the present invention. A notebook personal computer (information processing apparatus, communication apparatus) 100A according to the first embodiment, shown in FIG. 1, is made up of at least a CPU 1, an inputting device 2, a display device 3, a Bluetooth radio communication unit 4, a radio LAN communication unit 5, antennas 6, 7 and an antenna change-over switch 8.

Figure 6:
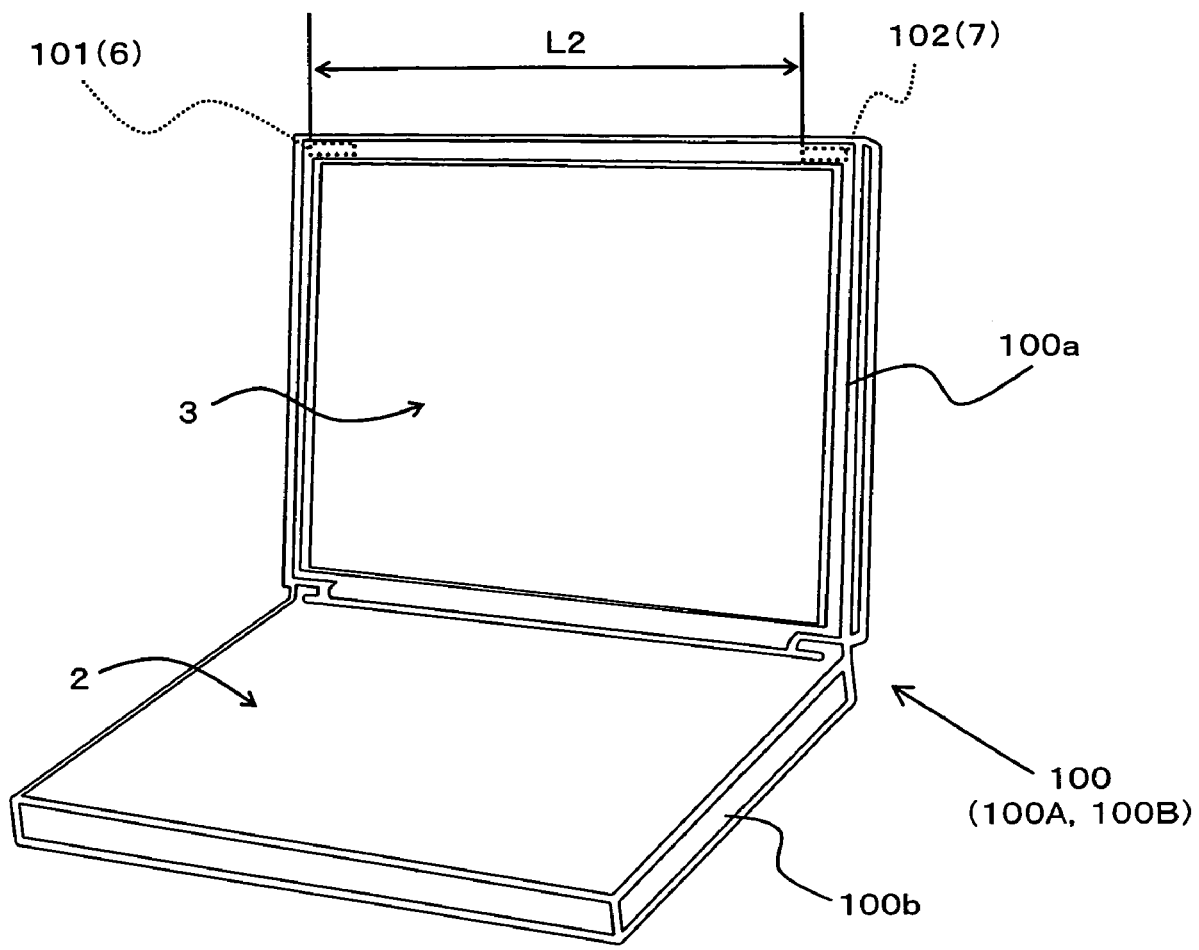
FIG. 6 is an illustrative perspective view for explaining a common notebook type personal computer and an antenna disposition state in the embodiment of the present invention.
Figure 7:
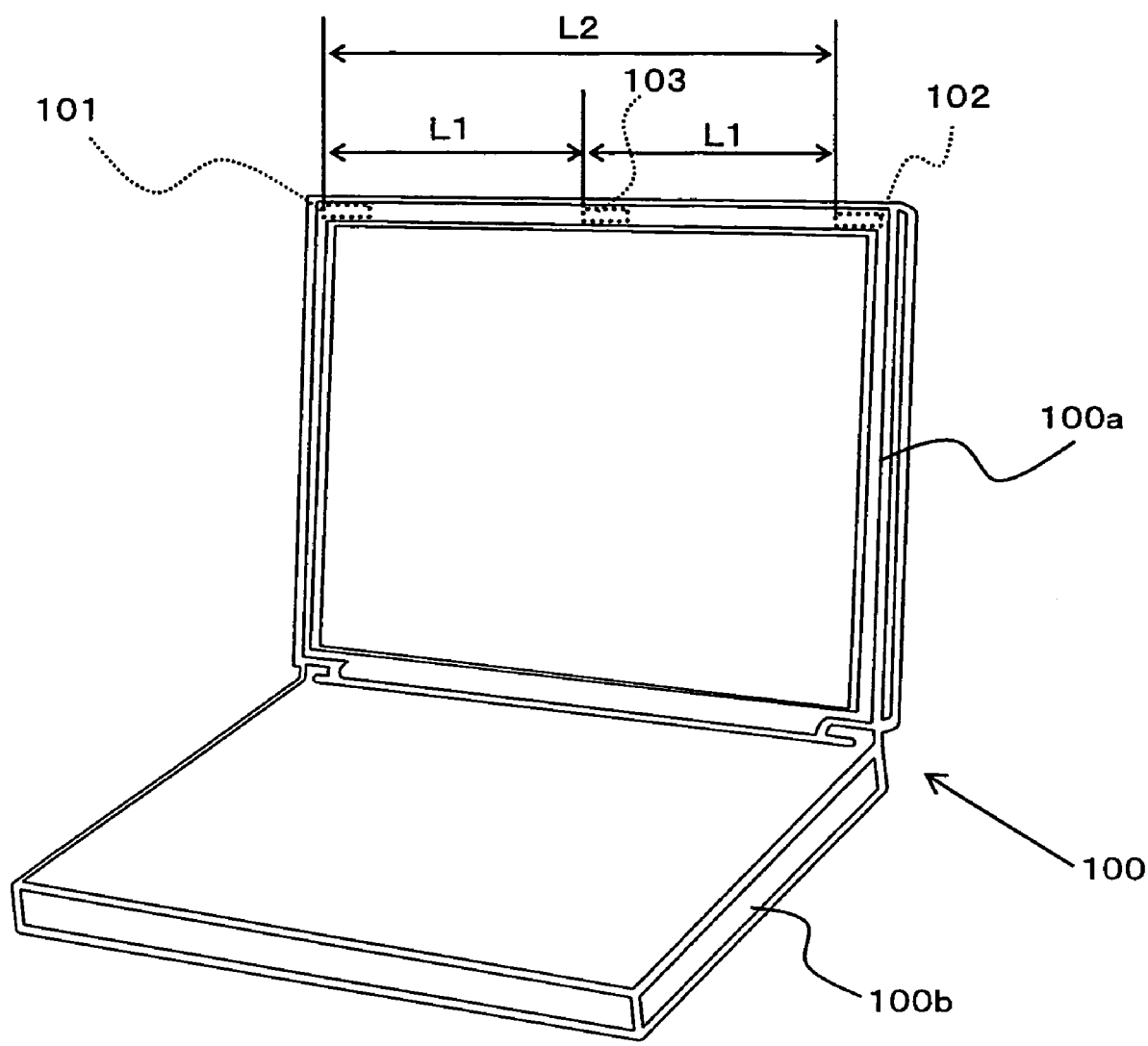
FIGS. 7 and 8 are illustrative perspective views for explaining antenna disposition states in a common notebook type personal computer.
Figure 8:
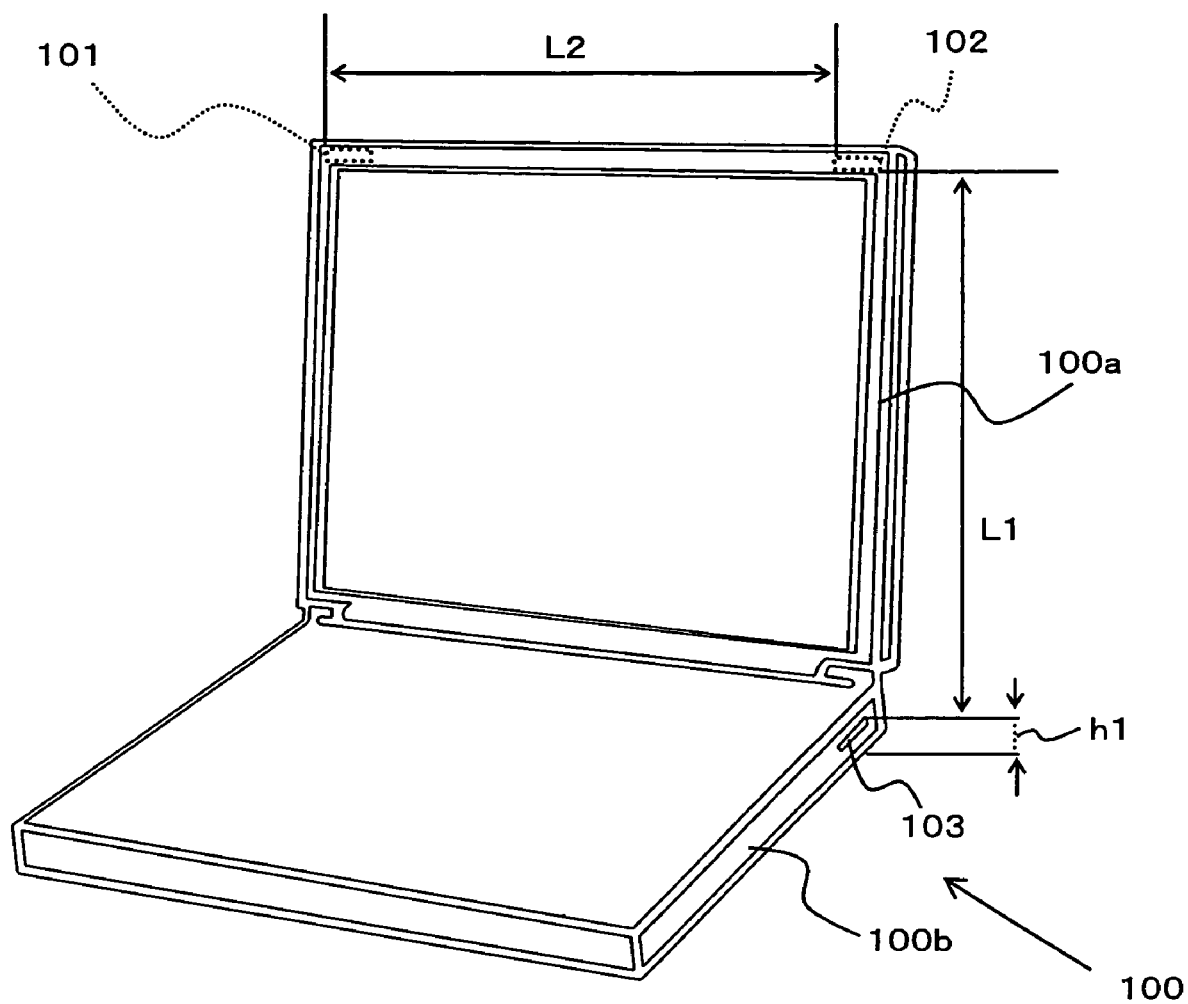

As well as the notebook personal computer 100 shown in FIG. 6, the notebook personal computer 100A according to the first embodiment also comprises two housings (display unit 100a including a display panel, which is a movable side housing, and a main body 100b including a keyboard and others, which is a fixed side housing), with these housings-being connected through a hinge to each other to be rotatable and made to be foldable owing to the hinge. In addition, also in the notebook personal computer 100A, as well as the notebook personal computer 100 shown in FIG. 6, two antennas 6 and 7 are internally placed at a position keeping a satisfactory line-of-sight distance from the apparatus, concretely, on both the right and left sides of an upper portion of the display unit 100a (display device 3) of the notebook personal computer 100A. In this connection, a Bluetooth communication device 4, a radio LAN communication device 5 and an antenna change-over switch 8, which will be mentioned later, are disposed within the main body 100b. Moreover, an antenna line 16, which is connected to the antenna change-over switch 8, and a second RF signal line (antenna line) 15 for radio LAN, which is connected to a diversity change-over switch 5c internally provided in the radio LAN communication device 5, are disposed in the display unit 100a and respectively connected to the two antennas 6 and 7 located in the same unit 100a.

The CPU (Central Processing Unit; processing apparatus) 1 is designed to control/manage the notebook personal computer 100A while executing various types of programs and fulfills characteristic functions according to the first embodiment of the present invention, i.e., functions as a switching control unit and a reception state providing means, described later.

The inputting device 2 is manipulated by an operator and functions as an inputting unit to input switching instruction information, mentioned later, to the CPU 1 and, for example, it is made up of a keyboard and a mouse.

The display unit 3 is for displaying various types of screens under control of display states by the CPU 1 and, for example, in the first embodiment, fulfills a function to display a switching/setting screen 3A which will be mentioned later with reference to FIG. 2 and further fulfills a function to, in cooperation with the function as the reception state providing means of the CPU 1, display a reception state of an electric wave for offering the reception state to the operator. For example, it is composed of an LCD (Liquid Crystal Display).

The Bluetooth communication device (communication unit) 4 is connected through a control signal line 11A to the CPU 1 and further connected through a Bluetooth RF signal line 13, the antenna change-over switch 8 and the antenna line 16 to the antenna 6 for carrying out radio data communications based on the Bluetooth through the antenna 6 in accordance with a control signal from the CPU 1. Incidentally, the control signal line 1A is a USB (Universal Serial Bus) forming a general-purpose serial bus according to a 2-line parallelism transmission channel method, while each of the Bluetooth RF signal line 13 and the antenna line 16 forms one coaxial line.

In the case of the data transmission processing using the antenna 6, this Bluetooth communication device 4 receives transmitted data from the CPU 1 through the general-purpose serial bus 11A and converts the data into a communication protocol, prescribed in the Bluetooth communication standard, according to a microprogram included therein and then carries out the encoding processing for converting it into an RF signal through the use of a built-in radio device and outputting to the Bluetooth RF signal line 13. Moreover, for the data reception processing using the antenna 6, the Bluetooth communication device 4 receives an RF signal from the antenna 6 through the Bluetooth RF signal line 13, and converts it into a digital signal through the use of the aforesaid radio device and then carries out the decoding processing for processing the decoded data into a state, the CPU 1 can recognize, according to a protocol through the use of the aforesaid microprogram and transmitting it through the control signal line 11A to the CPU 1.

The radio LAN communication device (communication unit having a diversity function) 5 is connected through a control signal line 11B to the CPU 1 and fixedly connected through the radio LAN second RF signal line (antenna line) 15 to the antenna 7 and further connected through a radio LAN first RF signal line 14, the antenna change-over switch 8 and the antenna line 16 to the antenna 6 so as to enable connection/disconnection to/from the antenna 6 so that radio data communications can be made through the antenna 6 or 7 in accordance with a control signal from the CPU 1. Incidentally, the control signal line 11B is a PCI bus (Peripheral Component Interconnect) composed of a 32-bit-width data signal line and a command signal line, while each of the radio LAN first RF signal line 14 and the radio LAN second RF signal line (antenna line) 15 is one coaxial line.

This radio LAN communication device 5 is made up of a radio LAN communication control unit 5a, a transceiver 5b for making transmission/reception under control of the radio LAN communication control unit 5b and a diversity change-over switch 5c under the switching control: of the same radio LAN communication control unit 5a. The transceiver 5b and the diversity change-over switch 5c are connected through a reception signal line 17 and a transmission signal line 18 to each other, and each of the signal lines 17 and 18 is one coaxial line.

In the case of the data transmission processing using the antenna 6 or 7, the radio LAN communication device 5 receives transmitted data from the CPU 1 through the control signal line 11B and converts it into a communication protocol, prescribed in the IEEE802.11a/b communication standard (Institute of Electronic and Electronics Engineers), according to a microprogram internally included in the radio LAN communication control unit 5a and, after the conversion thereof into an RF signal in the transceiver 5b, outputs the converted RF signal to the transmission signal line 18. For the data reception processing using the antenna 6 or 7, the radio LAN communication device 5 receives an RF signal from the antenna 6 or 7 through the reception signal line 17 and converts it into a digital signal through the use of the transceiver 5b and, after the decoding processing, processes the decoded data into a state, the CPU 1 can recognize, according to a protocol through the use of a microprogram internally included in the radio LAN communication control unit 5a for transmitting it through the control signal line 11B to the CPU 1.

The diversity change-over switch 5c selects one of the two antennas 6 and 7, which has a lower reception/transmission error rate, and carries out a switching connection between the selected antenna 6 or 7 and the transceiver 5b.

In this case, an RX terminal and a TX terminal in the diversity change-over switch 5 are connected through the reception signal line 17 and the transmission signal line 18 to the transceiver 5b, and an SEL_RX terminal and a SEL_Y1 terminal therein are connected through a transmission/reception switching signal line 19 and a diversity switching signal line 20 to the radio LAN communication control unit 5a. In addition, the diversity change-over switch 5c receives, at the SEL_RX terminal, a transmission/reception switching signal from the radio LAN communication control unit 5a through the transmission/reception switching signal line 19 to carry out the switching between transmission and reception in accordance with the received transmission/reception switching signal while it receives, at the SEL_Y1 terminal, a diversity switching signal from the radio LAN communication control unit 5a through the diversity switching signal line 20 to carry out the switching between the Y1 terminal (antenna 6) and the Y2 terminal (antenna 7).

Incidentally, the transmission/reception switching signal line 19 and the diversity switching signal line 20 are for indicating the switching in the diversity change-over switch 5c with High (high level)/Low (low level) of a signal, and the diversity change-over switch 5c makes a connection between the reception signal line 17 and the antenna when a signal inputted through the transmission/reception switching signal line 19 to the SEL-RX terminal shows High, while making a connection between the transmission signal line 18 and the antenna when Low. In addition, the diversity change-over switch 5c is operated to select the Y1 terminal (antenna 6) when a signal shows High on the diversity switching signal line 20 while selecting the Y2 terminal (antenna 7) when Low.

When the data received by the antenna shows a poor error rate or a poor reception sensitivity, the radio LAN communication control unit 5a carries out the control to make the switching to the other antenna through the use of a diversity switching signal. When this control always takes place, the antenna having a good state is selected at all times.

However, in the diversity change-over switch 5c according to this embodiment, the Y1 terminal is connected through the radio LAN first RF signal line 14, the antenna change-over switch 8 and the antenna line 16 to the antenna 6 to enable the connection/disconnection, while the Y2 terminal is fixedly connected directly through the radio LAN second RF signal line (antenna line) 15 to the antenna 7. Accordingly, in a case in which the antenna change-over switch 8, mentioned later, is in the switched state to the radio LAN (terminal B) side, the radio LAN communication device 5 carries out the radio data communication while selecting one of the antennas 6 and 7, which shows a lower reception/transmission error rate, through the use of the diversity function, and when the antenna change-over switch 8, mentioned later, is in the switched state to the Bluetooth (terminal A) side, since the radio LAN communication device 5 receives an electric wave from only the antenna 7, the switching control is automatically implemented according to a microprogram internally included in the radio LAN communication control unit 5a so that the diversity change-over switch 5c is connected to only the antenna 7.

The antenna change-over switch (switching unit) 8 is for carrying out the switching connection of the antenna 6 to one of the communication devices 4 and 5 and, in this antenna change-over switch 8, the Y terminal is connected through the antenna line 16 to the antenna 6 and the SEL terminal is connected through the antenna switching signal line 12 to the CPU 1, while the A terminal is connected through the Bluetooth RF signal line 13 to the Bluetooth communication device 4 and the B terminal is connected through the radio LAN first RF signal light 14 to the radio LAN communication device 5.

This antenna change-over switch 8 is designed to, in accordance with an antenna switching signal from the CPU 1, make the switching to one of a connected state between the A terminal and the Y terminal (state in which the Bluetooth communication device 4 is connected to the antenna 6) and a connected state between the B terminal and the Y terminal (state in which the radio LAN communication device 5 is connected to the antenna 6). In this connection, the antenna switching signal line 12 is for giving an instruction on the aforesaid switching to the antenna change-over switch 8 through the use of High (high level)/Low (low level) of a signal, and the antenna change-over switch 8 makes a connection between the A terminal and the Y terminal when the signal shows High, while it makes a connection between the B terminal and the Y terminal when Low.

In particular, when radio data communications are simultaneously made through the use of both the two communication devices 4 and 5 (in the case of the use of the Bluetooth communication device 4), the antenna change-over switch 8 according to the first embodiment makes the connection between the Bluetooth communication device 4 and the antenna 6 so that the communication devices 4 and 5 are connected to the antennas 6 and 7, respectively, while, when only the radio LAN communication device 5 is used without employing the Bluetooth communication device 4, it makes the connection between the radio LAN communication device 5 and the antenna 7 so that the antennas 6, 7, the needed number (in this case, two) of which is determined in view of the realization of the diversity function, are connected to the radio LAN communication device 5.

Furthermore, the CPU 1 functions as a switching control unit to switch the connection state between the antenna 6 and the communication device 4, 5 by executing a predetermined antenna switching control program (application program) for controlling the antenna change-over switch 8, and further functions as a reception state providing means to offer information on an electric wave reception state of the communication device 4 or 5, which is in use, to the aforesaid operator.

In a case in which the CPU 1 functions as the switching control unit, as mentioned above, when the radio data communications are simultaneously made through the use of both the two communication devices 4 and 5 (in the case of the employment of the Bluetooth communication device 4), the CPU 1 controls the antenna change-over switch 8 so as to make a connection between the Bluetooth communication device 4 and the antenna 6, and when the radio data communication is made using only the radio LAN communication device 5 without employing the Bluetooth communication device 4, the CPU 1 controls the antenna change-over switch 8 so as to make a connection between the radio LAN communication device 5 and the antenna 7. At this time, the CPU 1 according to the first embodiment is made to carry out the switching control on the antenna change-over switch 8 in accordance with switching instruction information (information on whether or not to use the Bluetooth communication device 4) inputted through the inputting device 3 by the operator.

Figure 2:
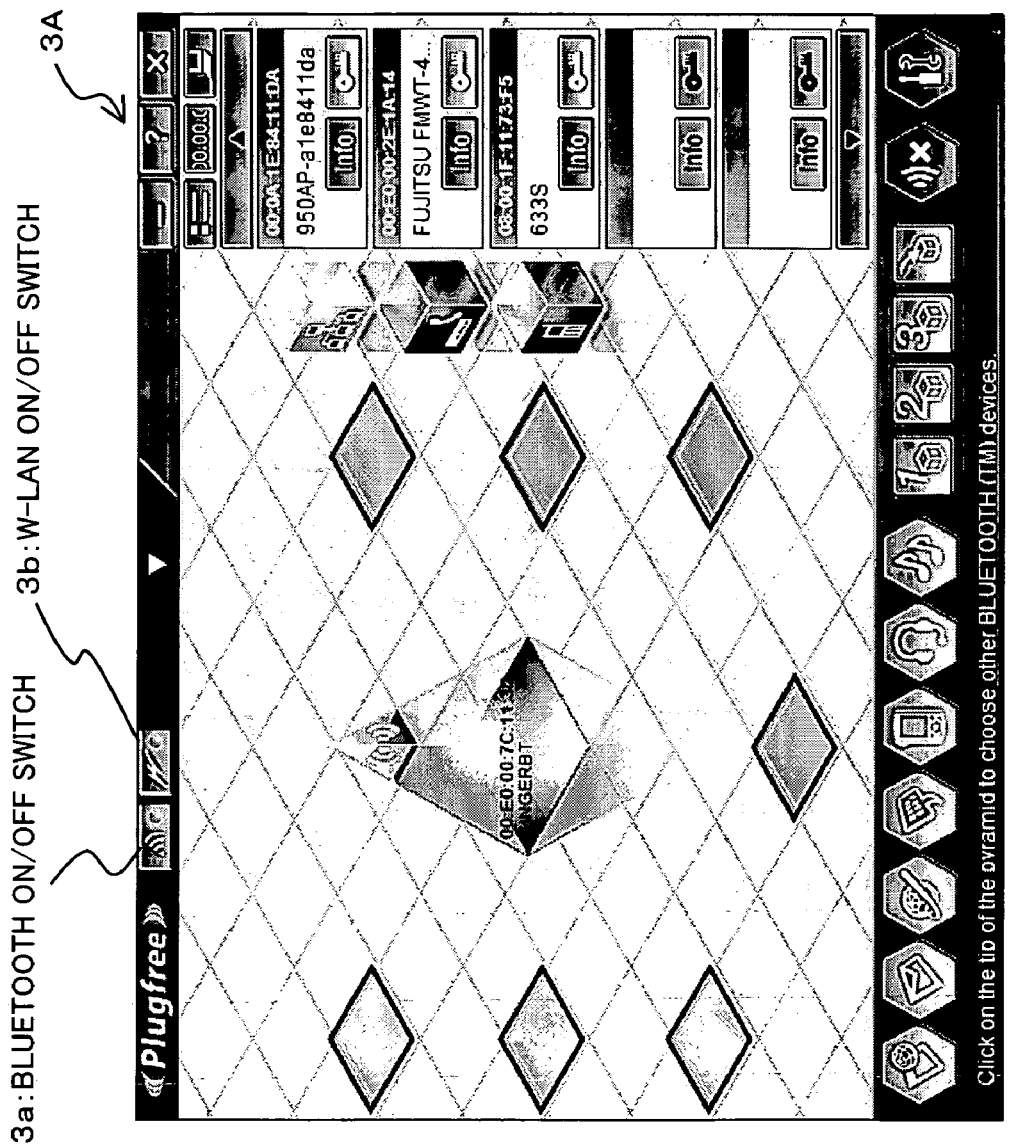
FIG. 2 is an illustration of an example of a switching/setting screen of a communication apparatus (antenna) according to the first embodiment.

In addition, when the operator carries out the on/off-switching/setting (antenna switching instruction) on the Bluetooth communication device 4 and the radio LAN communication device 5, the CPU 1 makes the display device 3 display the switching/setting screen 3A shown in FIG. 2 and functions as the aforesaid reception state providing means to make the display device 3 display the electric-wave reception states of the communication devices 4 and 5 (a state of display on the reception state is not shown).

Moreover, when referring to the electric-wave reception state and the switching/setting screen 3A, through the use of a mouse (inputting device 2), the operator click-operates each of a Bluetooth on/off switch (icon; software button on an application) 3a and a W-LAN on/off switch (icon; a software button on an application) 3b while making reference to the electric-wave reception state, thereby enabling the on/off-setting of the Bluetooth communication device 4 or the radio LAN communication device 5.

A dedicated software (antenna switching control program) for the realization of the functions as the switching control unit and the reception state providing means in the CPU 1 can be presented in a state recorded on a computer-readable recording medium such as flexible disk, CD-ROM, CD-R, CD-RW or DVD. In this case, the computer (CPU 1) reads out the antenna switching control program from this recording medium and transfers it to an internal storage unit or an external storage unit for the storage therein. Moreover, it is also appropriate that the antenna switching control program is recorded in a storage unit (recording medium) such as magnetic disk, optical disk or magneto optical disk and then offered from this storage unit through a communication line to the computer (CPU 1). Although in this description the antenna switching control program from a storage medium outside a computer is stored in a storage unit within the computer, it is also acceptable that the antenna switching control program is previously stored in a storage unit within the computer at the shipment from a factory.

In this case, the computer is a concept including a hardware and an OS (operating system) and signifies a hardware operating under control of the OS. Moreover, in a case in which the OS is unnecessary and the hardware is operated by an application program itself, the hardware itself corresponds to the computer. The hardware has at least a microprocessor such as a CPU and a means for reading out a computer program recorded in a recording medium. An application program as the aforesaid antenna switching control program includes a program code for making a computer, such as mentioned above, realize the switching control unit and reception state providing means. Still moreover, it is also acceptable that a portion of the functions is realized by the OS instead of the application program.

In addition, as the recording medium in this embodiment, it is also possible to employ, in addition to the above-mentioned flexible disk, CD-ROM, CD-R, CD-RW, DVD, magnetic disk, optical disk and magneto optical disk, various types of computer-readable mediums including an IC card, ROM cartridge, magnetic tape, punch card, internal storage unit (memory such as RAM or ROM) of a computer, external storage unit and code-printed matters such as bar code.

A description will be given hereinbelow of an operation of the notebook personal computer 100A thus configured according to the first embodiment.

As described above, the notebook personal computer 100A according to the first embodiment is equipped with communication devices (the Bluetooth communication device 4 and the radio LAN communication device 5) based on two types of communication modes different from each other and two antennas 6 and 7 independent of each other, with one (in this case, the RF signal line 15) of the two RF signal lines 14 and 15 for the radio LAN communication device 5 having 2 diversity functions being fixedly connected directly to the antenna 7. Moreover, the other RF signal line 14 and the RF signal line of the Bluetooth communication device 4 are switching-connected through the antenna change-over switch 8 to the antenna 6 and only one of the RF signal lines (only one of the communication devices 4 and 5) is connected through the antenna change-over switch 8 to the antenna 6.

In addition, in the notebook personal computer 100A according to the first embodiment, by an operation using the inputting device 2, the antenna change-over switch 8 can be operated through an application program (antenna switching control program) operating on the OS internally included in the notebook personal computer 100A. That is, the operator of the notebook personal computer 100A manipulates, through the inputting device 2, a software button (the Bluetooth on/off switch 3a in the switching/setting screen 3A) on an application for selection on whether or not to use the Bluetooth communication device 4, thus switching the antenna change-over switch 8 so that, in the case of the use of the Bluetooth communication device 4, the radio LAN communication device 5 is used in a single antenna mode while, in the case of no use of the Bluetooth communication device 4, only the radio LAN communication device 5 is operated in a diversity mode. Therefore, the operator can arbitrarily select one of the single antenna mode and the diversity mode and perform the switching thereto.

When both the two communication devices 4 and 5 are used at the same time, the operator sets the Bluetooth on/off switch 3a at the on-state in the switching/setting screen 3A, shown in FIG. 2, through the inputting device 2. Accordingly, through the function as the switching control unit in the CPU 1, the antenna change-over switch 8 is switched so that the Bluetooth communication device 4 and the antenna 6 are connected to each other. This enables that the Bluetooth communication unit 4 carries out the radio data communication through the use of the antenna 6 and, simultaneously with this, the radio LAN communication device 5 carries out the radio data communication through the use of only the antenna 7.

However, for the simultaneous use of the two communication units 4 and 5, the radio LAN communication device 5 can use only the antenna 7 and difficulty is experienced in performing the switching-use of the antennas 6 and 7 by the diversity function and, hence, the communicable covering range of the radio LAN communication device 5 is limited by the radiation characteristic of the antenna 7 and the problem on the communication distance stemming from the wavelength. Accordingly, in the case of no use of the Bluetooth communication device 4, the antenna change-over switch 8 is switched to the radio LAN side so that the antenna 6 is connected to the radio LAN communication device 5. This switching can manually be performed through the switching/setting screen 3A in a manner that the operator uses the inputting device 2, or it can automatically be carried out through the use of the function as the switching control unit in the CPU 1 as will be mentioned later.

In the state of the connection between the antenna 6 and the radio LAN communication device 5, the radio LAN communication device 5 can receive an electric wave through the use of both the antennas 6 and 7. Therefore, the radio LAN communication control unit 5a automatically switching-controls the diversity change-over switch 5c to realize the diversity function for carrying out the radio data communication while selecting the antenna 6 or 7 which can produce a satisfactory reception state, thereby enlarging the communicable covering range of the radio LAN communication device 5.

Furthermore, in a case in which the operator manipulates the on/off switches 3a and 3b on the switching/setting screen 3A for giving an antenna switching instruction like the first embodiment, there is a possibility that the radio LAN communication device 4 disconnects the antenna 6, which is in use, in error and makes a connection to the Bluetooth communication device 4 so that the radio LAN communication device 5 falls into a communication cut-off state. For preventing this, in the first embodiment, at least an electric-wave reception state stemming from the radio LAN communication device 5 is displayed on the display device 3 through the use of the function as the reception state providing means in the CPU 1, thereby providing, to the operator, the information on whether or not a problem exists when the connection state of the antenna 6 is switched for using the Bluetooth communication device 4.

Figure 3:
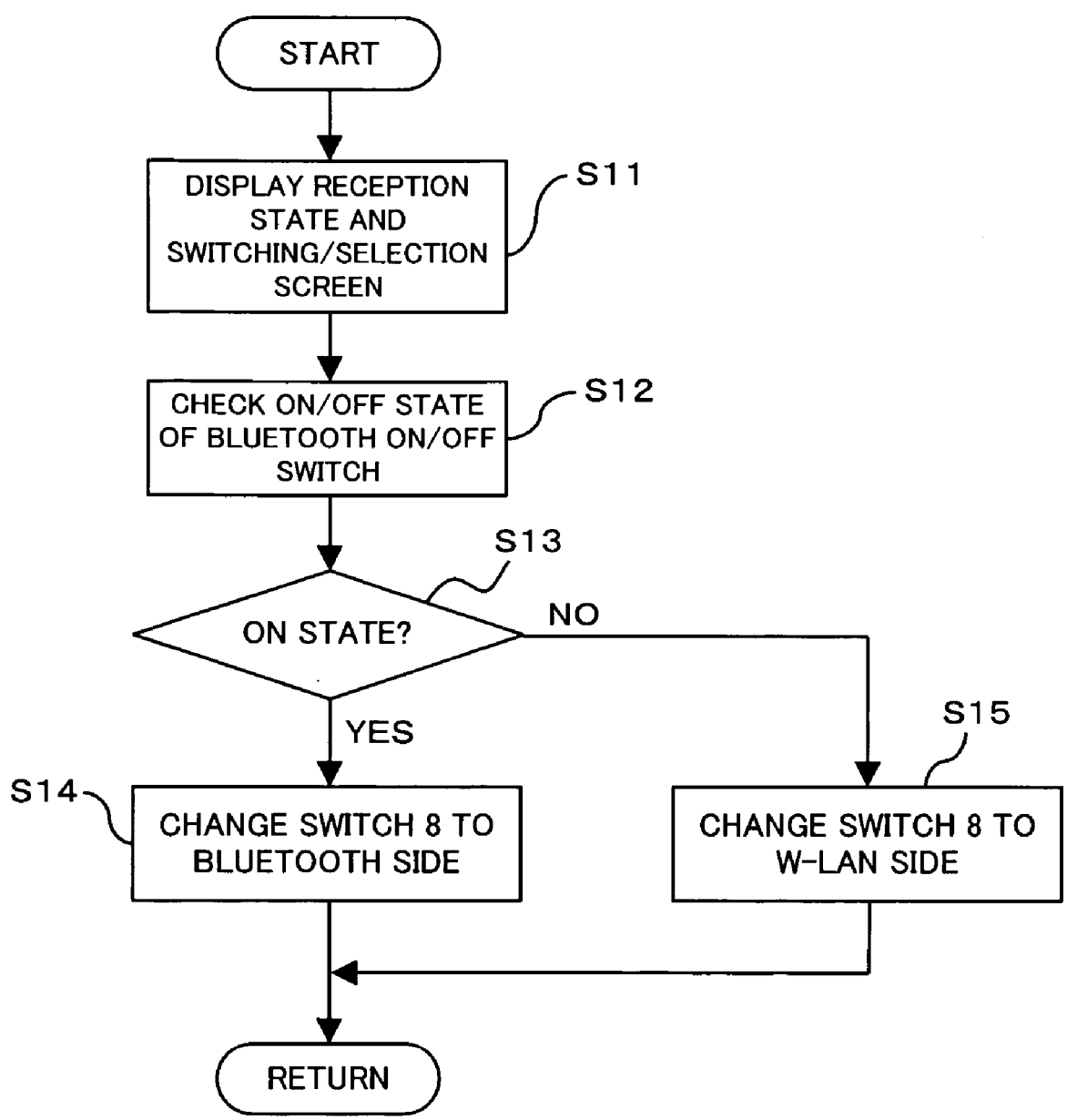
FIG. 3 is a flowchart for explaining an antenna switching control procedure in the information processing apparatus shown in FIG. 1.

According to a flow chart (steps S11 to S15) of a flow chart of FIG. 3, a brief description will be given of an antenna switching control procedure (operations of the switching control unit and the reception state providing means to be realized when the CPU 1 executes the antenna switching control program) in the notebook personal computer 100A shown in FIG. 1.

Upon receipt of a request for the switching/section of the communication devices 4 and 5 (that is, switching/section of the antennas 6 and 7) from the operator, the CPU 1 first makes the display device 3 display electric-wave reception states in the communication devices 4 and 5 (in particular, the radio LAN communication device 5) and makes the display device 3 displays the switching/selection screen 3A shown in FIG. 2 (step S11).

When referring to the electric-wave reception state and the switching/setting screen 3A, through the use of a mouse (inputting device 2), the operator click-operates each of the Bluetooth on/off switch 3a and the W-LAN on/off switch 3b while making reference to the electric-wave reception state, thereby carrying out the on/off-setting of the Bluetooth communication device 4 or the radio LAN communication device 5.

In accordance with this setting operation, the CPU 1 checks the on/off state of the Bluetooth on/off switch 3a (step S12) and, if it is in the on-state (YES route from step S13), switches the antenna change-over switch 8 to the Bluetooth side so as to establish a connection between the antenna 6 and the Bluetooth communication device 4 (step S14) and, on the other hand, if it is in the off-state (NO route from step S13), switches the antenna change-over switch 8 to the radio LAN side so as to establish a connection between the antenna 6 and the radio LAN communication device 5 (step S15).

Also in a state before the operation of the antenna switching control program (application program) made to operate on the OS, or in the case of the absence of the antenna switching control program, that is, if the antenna switching control program is in anon-activated condition, a BIOS (Basic Input/Output System) internally included in the CPU 1 fulfills a function to make a static connection of the antenna change-over switch 8 to one of the communication devices 4 and 5 according to a state of its own setup menu so that the Bluetooth device 4 is available, thus realizing a function whereby the normal operation is feasible even before the install of the antenna switching control program.

As described above, with the notebook personal computer (portable information processing apparatus) 100A according to the first embodiment of the present invention, when radio data communications are simultaneously made through the use of both the communication devices 4 and 5, the antenna change-over switch 8 is switched to the Bluetooth side so that the communication devices 4 and 5 are connected to the antennas 6 and 7, respectively, thus enabling the radio data communications to be simultaneously made according to two types of communication modes.

On the other hand, when the radio data communication is made using only the radio LAN communication device 5 without using the Bluetooth communication device 4, the antenna change-over switch 8 is switched to the radio LAN side so as to make connections between the radio LAN communication device 5 and the two antennas 6, 7, thus utilizing the diversity function to enable the radio data communication to be made while selecting the antenna 6 or 7 which can provide a satisfactory reception state.

Accordingly, in the notebook personal computer 100A according to this embodiment equipped with the radio LAN communication device 5 having the diversity function and the Bluetooth communication device 4, it is possible to equalize the number of communication devices with the number of antennas, which enables the two communication devices 4 and 5 to simultaneously carry out the transmission/reception independently of each other without increasing the number of antennas, and further to sufficiently utilize the diversity function of the radio LAN communication device 5 in the case of no use of the Bluetooth communication device 4. This permits further size reduction of the notebook personal computer 100A equipped with a plurality of radio communication functions including the radio LAN having the diversity function.

In addition, the notebook personal computer 100A according to the first embodiment employs the function as the switching control unit in the CPU 1, which enables the automatic control on the antenna switching state and further enables the antenna switching (manual switching) according to the switching instruction information inputted through the inputting device 2 by the operator. In particular, when the operator inputs the switching instruction information through the inputting device 2, the function as the reception state providing means in the CPU 1 presents, to the operator, the electric-wave reception state on the communication device 4 or 5 which is using the antenna 6, thereby reliably preventing the occurrence of a communication cut-off state in the communication device 4 or 5 because of the switching of the antenna 6 in use in error.

Still additionally, in the notebook personal computer 100A according to the first embodiment, the two antennas 6 and 7 are internally included in an upper portion of the display unit 100b and, hence, when the notebook personal computer 100A is in use, the two antennas 6 and 7 are disposed at a high position which can provide a satisfactory line-of-sight distance, and at least a physical distance of approximately 20 cm is securable between the two antennas 6 and 7. Therefore, in a case in which, like the this embodiment, the Bluetooth and the radio LAN having two-antenna diversity function are employed as communication modes, the two antennas 6 and 7 internally included in an upper portion of the display unit 100b can be used while keeping a sufficient physical distance, which can provide a sufficient communication performance (communication distance) without receiving the influence of the material of a desk or the like, particularly, at the use of the Bluetooth while preventing the degradation of the signal/noise ratio.

Although in the above-described first embodiment the CPU 1 carries out the switching control on the antenna change-over switch 8 in accordance with the switching instruction information (information on whether or not to the Bluetooth communication device 4) inputted through the inputting device 3 by the operator, it is also appropriate that, in accordance with using situations of the communication devices 4 and 5, the switching control on the antenna change-over switch 8 is automatically executed through the use of the function as the switching control unit in the CPU 1. For example, the control can automatically be executed through the use of the function as the switching control unit in the CPU 1 so that, only when the Bluetooth communication device 4 is put to use, the antenna change-over switch 8 is switched to the Bluetooth side and, when the Bluetooth communication device 4 is not put to use, the antenna change-over switch 8 is switched to the radio LAN side.

Moreover, in the above-described first embodiment, it is also appropriate that, in a case in which both the on/off switches 3*a* and 3*b* of the switching/selection screen 3A are set at the off-states so as not to use both the communication devices 4 and 5, the CPU 1 switches the antenna change-over switch 8 to the Bluetooth side for connecting the antenna 6 to the Bluetooth communication device 4 and switches the antenna change-over switch 8 to the radio LAN side for connecting the antenna 6 to the radio LAN communication device 5.

[2] Description of Second Embodiment

Figure 4:
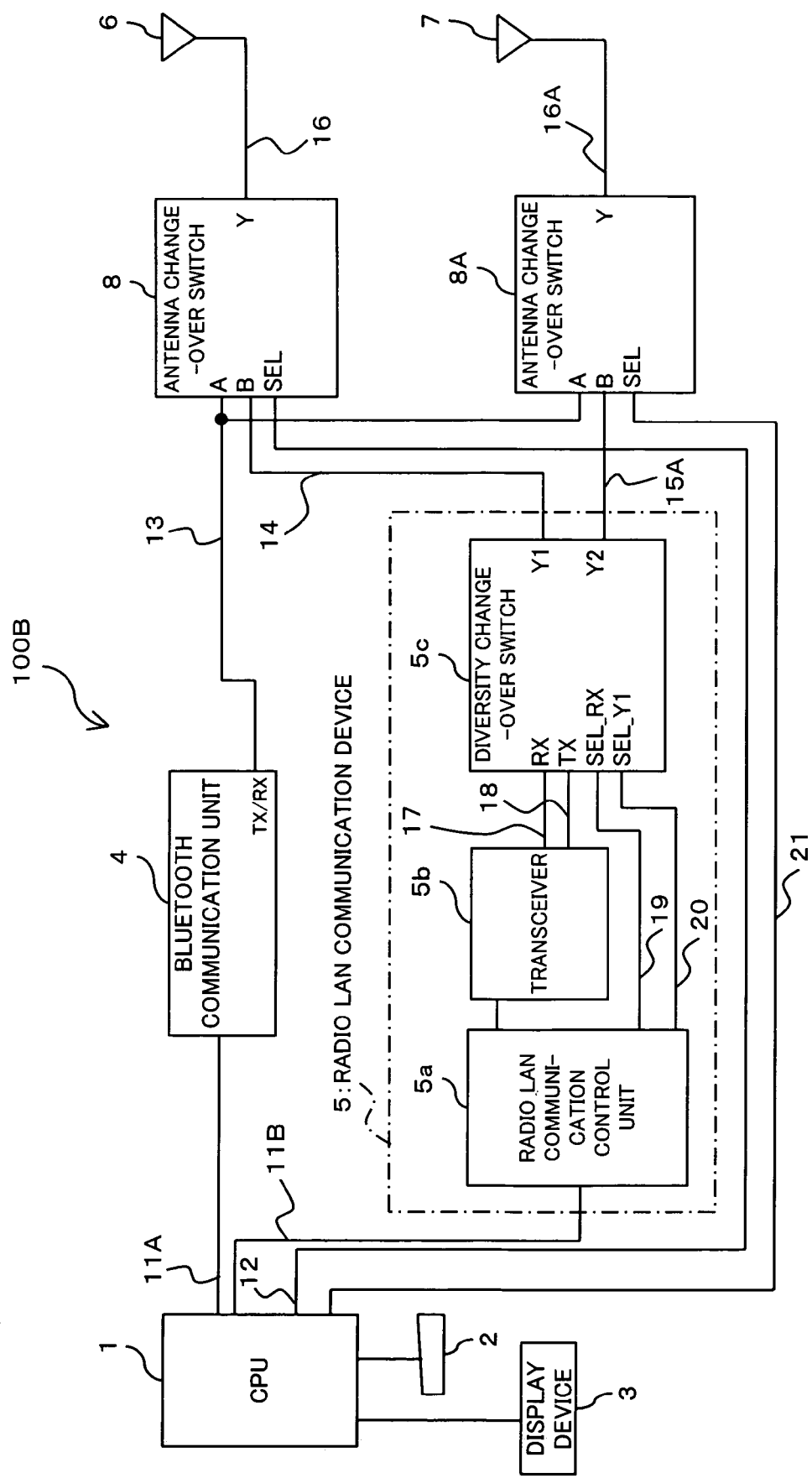
FIG. 4 is a block diagram showing a configuration of an information processing apparatus (communication apparatus) having an antenna switching function according to a second embodiment of the present invention.

FIG. 4 is a block diagram showing a configuration of an information processing apparatus (communication apparatus) having an antenna switching function according to a second embodiment of the present invention. A notebook personal computer (information processing apparatus, communication apparatus) 100B according to the second embodiment, shown in FIG. 4, comprises a CPU 1, an inputting device 2, a display device 3, a Bluetooth communication unit 4, a radio LAN communication unit 5, antennas 6, 7 and an antenna change-over switch 8 as well as the notebook personal computer 100A according to the first embodiment, and further comprises an antenna change-over switch 8A.

In FIG. 4, the same reference numerals as those used above designate the same or almost same parts, and the description thereof will be omitted. Moreover, as in the case of the notebook personal computer 100, the notebook personal computer 100B according to the second embodiment also has two housings (display unit 100*a* including a display panel and a main body 100*b* including a keyboard and others), and these housings are connected through a hinge to each other to be rotatable so that the notebook personal computer 100B is foldable owing to the hinge. Moreover, as well as the notebook personal computer 100 shown in FIG. 6, also in the notebook personal computer 100B, two antennas 6 and 7 are internally placed at a position keeping a satisfactory line-of-sight distance from the apparatus, concretely, on both the right and left sides of an upper portion of a display unit 100*a* (display device 3) of the notebook personal computer 100B.

The antenna change-over switch 8 is located between the communication devices 4 and 5, while the antenna change-over switch (switching unit) 8A is located between the communication devices 4, 5 and the antenna 7 for carrying out the switching-connection of the antenna 7 to one of the communication devices 4 and 5. In this antenna change-over switch 8A, the Y terminal is connected through an antenna line 16A to the antenna 7 and the SEL terminal is connected through an antenna switching signal line 21 to the CPU 1, while the A terminal is connected through a Bluetooth RF signal line 13 to the Bluetooth communication device 5 and the B terminal is connected through a radio LAN second RF signal line 15 to the radio LAN communication device 5. As well as the antenna change-over switch 8, this antenna change-over switch 8A is placed in the main body 100*b* and the antenna line 16A to be connected thereto is located in the display unit 100*a* and connected to the antenna 7 located in the same unit 100*a*.

This antenna change-over switch 8A is made to, in accordance with an antenna switching signal from the CPU 1, conduct the switching to one of a state in which the A terminal and the Y terminal are connected to each other (state in which the Bluetooth communication device 4 is connected to the antenna 7) and a state in which the B terminal and the Y terminal are connected to each other (state in which the radio LAN communication device 5 is connected to the antenna 7). The antenna switching signal line 21 is for giving an instruction on the switching to the antenna change-over switch 8A with High (high level)/Low (low level) of a signal, and the antenna change-over switch 8A makes a connection between the A terminal and the Y terminal when the signal shows High and makes a connection between the B terminal and the Y terminal when Low.

Furthermore, the CPU 1 according to the second embodiment is for controlling/managing the notebook personal computer 100B while executing various types of programs and, particularly, functions as a switching control unit which is a characteristic function of the second embodiment of the present invention.

The function as the switching control unit according to the second embodiment is designed to control the antenna change-over switches 8 and 8A for connecting the antenna 6 (or 7) to be used by the radio LAN communication device 5 having the diversity function to the radio LAN communication device 5 through the use of the antenna change-over switch 8 (or 8A) and further for connecting the other antenna 7 (or 6), which is not used by the radio LAN communication device 5, to the Bluetooth communication device 4 through the use of the antenna change-over switch 8A (or 8). That is, in the second embodiment, the antenna 6 or 7, which is not used by the radio LAN communication device 5 with the diversity function, is automatically allocated to the Bluetooth communication device 4.

As in the case of the first embodiment, a dedicated software (antenna switching control program) for the realization of the functions as the switching control unit according to the second embodiment can be presented in a state recorded on a computer-readable recording medium such as flexible disk, CD-ROM, CD-R, CD-RW or DVD, or it can also be presented from a storage unit such as magnetic disk, optical disk or magneto optical disk through a communication line to the computer (CPU 1).

Figure 5:
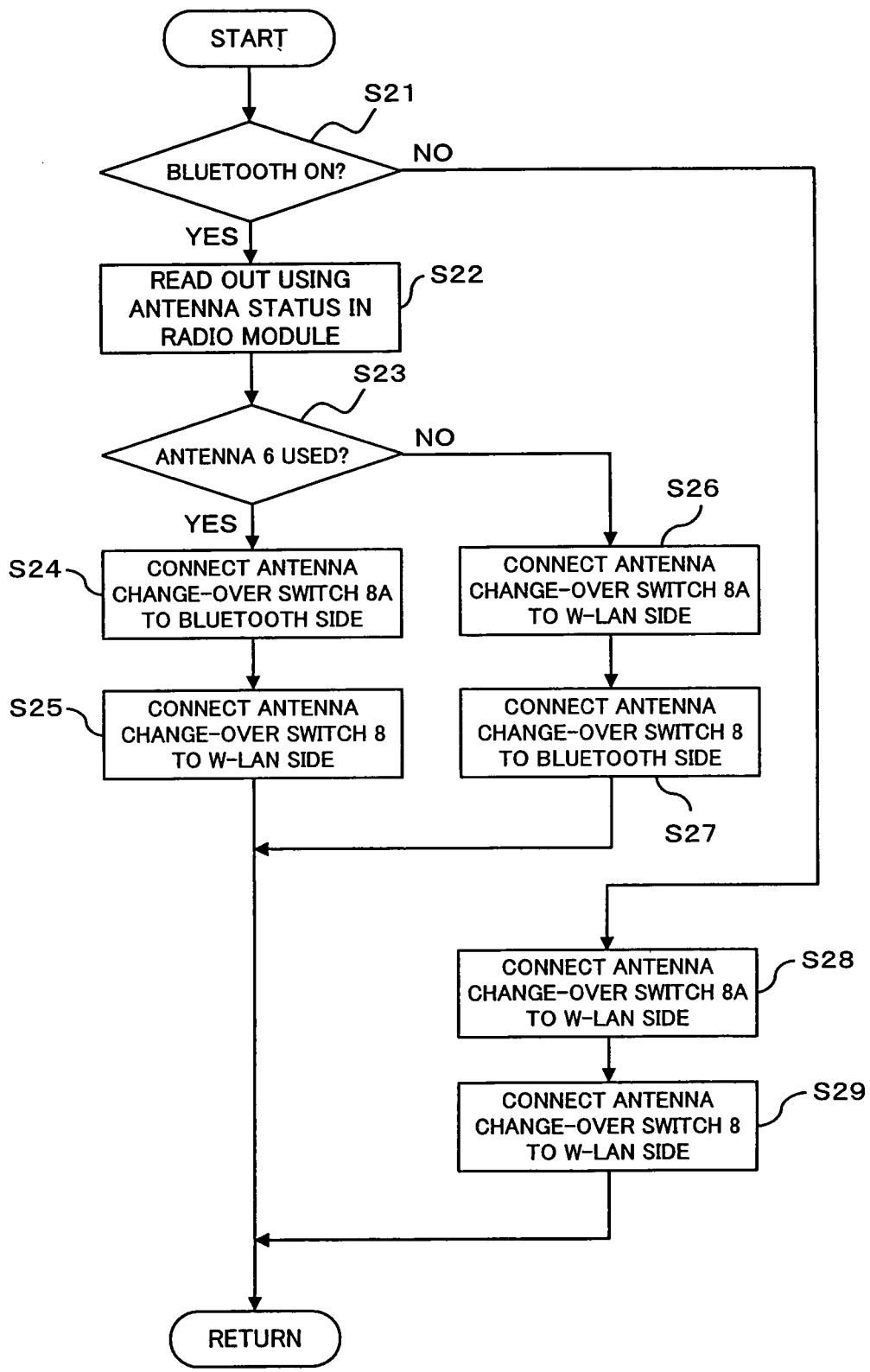
FIG. 5 is a flowchart for explaining an antenna switching control procedure in the information processing apparatus shown in FIG. 4.

In addition, with reference to a flow chart (steps S21 to S29) of FIG. 5, a description will be given hereinbelow of an antenna switching control procedure (operation of the switching control unit to be realized by the CPU 1 which executes the antenna switching control program) in the notebook personal computer 100B thus configured according to the second embodiment.

As described above, the notebook personal computer 100B according to the second embodiment is equipped with the two antennas 6 and 7, the radio LAN communication device 5 having the diversity function on both the antennas 6 and 7, and the Bluetooth communication device 4 made to carry out the radio data communication through the use of only one of the antennas 6 and 7.

Moreover, in a state of no use of the Bluetooth communication device 4, as well as the first embodiment, both the antennas 6 and 7 are connected to the radio LAN communication device 5 (step S28 from NO route of step S21, and step S29) and, in the radio LAN communication device 5, the radio LAN communication control unit 5a conducts the radio data communication while carrying out the switching-connection of the antenna 6 (or 7) of the two antennas 6 and 7, which has a lower error rate, through the diversity change-over switch 5c to the transceiver 5b.

In this state, when the Bluetooth communication device 4 is activated (YES route of step S21), the CPU 1 reads out an using antenna status (information on an RF signal the radio LAN communication device 5 is using) in a radio module to confirm which of the two antennas 6 and 7 the radio LAN communication device 5 is using (step S22).

If the antenna 6 is in use (YES route of step S23), the CPU 1 switches the antenna change-over switch 8A to the Bluetooth side to make a connection between the antenna 7 and the Bluetooth communication device 4 (step S24) and, with respect to the antenna change-over switch 8, continuously maintains the state switched to the radio LAN side (state of the employment of the radio LAN communication device 5 and the antenna 6) (step S25).

On the other hand, if the antenna 7 is in use (NO route of step S23), the CPU 1 continuously maintains the antenna change-over switch 8A in the state switched to the radio LAN side (state of the use of the radio LAN communication device 5 and the antenna 7) (step S26) and switches the antenna change-over switch 8 to the Bluetooth side to make a connection between the antenna 6 and the Bluetooth communication device 4 (step S27).

In addition, if the Bluetooth communication device 4 is turned off (NO route of step S21), both the antenna change-over switches 8 and 8A are switched to the radio LAN side to make the connection of both the antenna 6 and 7 with the radio LAN communication device 5 (steps S28 and S29).

Thus, the antenna 6 or 8 which is not used by the radio LAN communication device 5 having the diversity function can automatically be allocated to the Bluetooth communication device 4. Accordingly, it is possible to prevent the antenna the radio LAN communication device 5 is using from being disconnected in error, thereby reliably preventing the degradation of the performance due to the deterioration of the communication quality.

As described above, with the notebook personal computer (portable information processing apparatus) 100B according to the second embodiment of the present invention, when the Bluetooth communication device 4 is put to use, the antenna change-over switches 8 and 8A undergo the switching control so that the antenna 6 or 7, which is not used by the radio LAN communication device 5 having the diversity function which can control the two antennas, is connected to the Bluetooth communication device 4. Therefore, a satisfactory antenna radiation characteristic is securable at all times in the radio LAN communication device 5 and the radio data communication can be conducted by the Bluetooth communication device 4 while preventing the degradation of the performance stemming from the deterioration of the communication quality.

Also with the notebook personal computer 100B according to the second embodiment, as well as the notebook personal computer 100A according to the first embodiment, the two antennas 6 and 7 internally included in an upper portion of the display unit 100b can be used while keeping a sufficient physical distance, thus achieving a sufficient communication performance (communication distance) without receiving the influence of the material of a desk or the like, particularly at the employment of the Bluetooth, while preventing the deterioration of the signal/noise ratio.

[3] Others

The present invention is not limited to the above-described embodiments, and it is intended to cover all changes of the embodiments herein which do not constitute departures from the spirit and scope of the invention.

For example, although in the above description of the embodiments the present invention is applied to a notebook personal computer equipped with two types of communication modes of the radio LAN and the Bluetooth, the present invention is not limited to this but, as well as the above-described embodiments, it is also applicable to a case of three or more types of communication modes, a case of various types of communication modes (for example, communication modes based on a communication module of the third generation portable telephone) other than the radio LAN and the Bluetooth, and information processing apparatus [for example, small-sized portable information processing apparatus such as PDA (Personal Digital Assistant)] other than notebook personal computers, which can achieve the same effects as those of the above-described embodiments.

Furthermore, the communication devices according to the present invention is not limited to the communication devices made to carry out the data communications like the above-described embodiments but it can also be communication devices for conversations. Still furthermore, the information processing apparatus can also be an apparatus having a shape in which a display unit and a main body are accommodated in one housing (for example, single housing such as a pen computer), instead of the construction in which two housings connected through an hinge as mentioned in the above-described embodiments.

INDUSTRIAL APPLICABILITY

As described above, according to the present invention, in a case in which, for example, a communication unit based on a different communication mode (for example, Bluetooth) is provided in addition to a communication unit having a diversity function, the number of communication units is equalized with the number of antennas so that the plurality of communication units can simultaneously carry out transmission/reception without increasing the number of antennas, and the diversity function can sufficiently be utilized in the case of no use of a portion of the communication units.

Therefore, the present invention is suitable for use in an information processing apparatus such as a notebook type personal computer, for example, having Bluetooth and radio LAN, and it is considered that its availability is extremely high.

What is claimed is:

1. An information processing apparatus including an antenna switching function, comprising:
   a plurality of antennas;
   a plurality of communication units each capable of carrying out a radio communication;
   a switching unit capable of switching connection states between said plurality of antennas and said plurality of communication units;

a switching control unit for controlling said switching unit to switch said connection states;

an inputting unit manipulated by an operator for inputting switching instruction information for switching said connection states through said switching unit, wherein said switching control unit controls said switching unit, in accordance with said switching instruction information inputted from said inputting unit, to switch said connection states; and reception state providing means for providing, when said switching unit is to switch the connection states, an electric-wave reception state on said communication unit in use to the operator so that information as to whether the switching of the connection states by said switching unit causes a problem is provided to the operator, and when radio communications are simultaneously made through a use of said plurality of communication units, said switching unit making connections between said plurality of communication units and said plurality of antennas and, when radio communications are made through a use of a portion of said plurality of communication units, said switching unit making connections between the antennas, a number of which depends on communication modes of said communication units made to carry out the radio communications, and said communication units, wherein, when the radio communications are simultaneously made through the use of said plurality of communication units, said switching control unit controls said switching unit to make connections between said plurality of communication units and said plurality of antennas and, when the radio communications are made through the use of the portion of said plurality of communication units, said switching control unit controls said switching unit to make connections between said antennas, the number of which depends on the communication modes of said communication units made to carry out the radio communications, and said communication units.

2. The information processing apparatus including an antenna switching function according to claim 1, wherein at least one of said plurality of communication units has a diversity function whereby said plurality of antennas are controllable.

3. The information processing apparatus including an antenna switching function according to claim 1, wherein a movable side housing and a fixed side housing are rotatably connected to be foldable, and said plurality of antennas are provided in an upper portion of said movable side housing in a state opened.

4. A communication apparatus including an antenna switching function, comprising a plurality of antennas and a plurality of communication units each capable to carry out a radio communication, a switching unit being provided to switch connection states between said plurality of antennas and said plurality of communication units, and a switching control unit for controlling said switching unit to switch said connection states, wherein, when the radio communications are simultaneously made through a use of said plurality of communication units, said switching control unit controls said switching unit to make connections between said plurality of communication units and said plurality of antennas and, when the radio communications are made through a use of the portion of said plurality of communication units, said switching control unit controls said switching unit to make connections between said antennas, the number of which depends on the communication modes of said communication units made to carry out the radio communications, and said communication units, and an inputting unit manipulated by an operator for inputting switching instruction information for switching said connection states through said switching unit, wherein said switching control unit controls said switching unit, in accordance with said switching instruction information inputted from said inputting unit, to switch connection states, reception state providing means for providing, when said switching unit is to switch the connection states, an electric-wave reception state on said communication unit in use to the operator so that information as to whether the switching of the connection states by said switching unit causes a problem is provided to the operator, and when radio communications are simultaneously made through a use of said plurality of communication units, said switching unit makes connections between said plurality of communication units and said plurality of antennas and, when radio communications are made through the use of a portion of said plurality of communication units, said switching unit makes a connection between said antennas, the number of which depends on communication modes of said communication units made to carry out the radio communications, and said communication units.

5. The communication apparatus including an antenna switching function according to claim 4, wherein at least one of said plurality of communication units has a diversity function whereby said plurality of antennas are controllable.

6. An antenna switching control unit, which is used for an apparatus comprising a plurality of antennas, a plurality of communication units each made to carry out a radio communication and a switching unit made to switch connection states between said plurality of antennas and said plurality of communication units and which is made to control said switching unit to switch the connection states, controlling said switching unit so that, when radio communications are simultaneously made through the use of the plurality of communication units, said switching unit makes connections between said plurality of communication units and said plurality of antennas and, when radio communications are made through the use of a portion of said plurality of communication units, said switching unit makes connection between the antennas, the number of which depends on communication modes of said communication units made to carry out the radio communications, and said communication units, further comprising an inputting unit manipulated by an operator for inputting switching instruction information for switching said connection states through said switching unit, wherein said switching unit is controlled in accordance with said switching instruction information inputted from said inputting unit to switch said connection states; and reception state providing means for providing, when said switching unit is to switch the connection states, an electric-wave reception state on said communication unit in use to the operator so that information as to whether the switching of the connection states by said switching unit causes a problem is provided to the operator.

7. A computer-readable recording medium recording an antenna switching control program, which makes a computer function as an antenna switching control unit to, in an apparatus comprising a plurality of antennas, a plurality of communication units each made to carry out a radio communication and a switching unit made to switch connection states between said plurality of antennas and said plurality of communication units, control said switching unit to switch said connection states,
    wherein that said antenna switching control program makes said computer control said switching unit so that, when radio communications are simultaneously made through the use of said plurality of communication units, said switching unit makes connections between said plurality of communication units and said plurality of antennas and, when radio communications are made through the use of a portion of said plurality of communication units, said switching unit makes connection between the antennas, the number of which depends on communication modes of said communication units made to carry out the radio communications, and said communication units,
    wherein said antenna switching control program makes said computer control said switching unit in accordance with switching instruction information inputted from an inputting unit manipulated by an operator to switch said connection states through said switching unit,
    wherein said antenna switching control program makes said computer function as reception state providing means for providing, when said switching unit is to switch the connection states, an electric-wave reception state on said communication unit in use to the operator so that information as to whether the switching of the connection states by said switching unit causes a problem is provided to the operator.

8. An antenna switching control unit, capable of being used for an apparatus comprising a plurality of antennas, a plurality of communication units, and a switching unit capable of switching connection states between said plurality of antennas and said plurality of communication units and to control said switching unit to switch the connection states, controlling said switching unit so that, when radio communications are simultaneously made through a use of the plurality of communication units, said switching unit makes connections between said plurality of communication units and said plurality of antennas and, when radio communications are made through the use of a portion of said plurality of communication units, said switching unit makes connection between the antennas, the number of which depends on communication modes of said communication units made to carry out the radio communications, and said communication units, comprising:
    an inputting unit manipulated by an operator for inputting switching instruction information for switching said connection states through said switching unit, wherein said switching unit is controlled in accordance with said switching instruction information inputted from said inputting unit to switch said connection states; and
    a processor for providing, when said switching unit is to switch the connection states, an electric-wave reception state on said communication unit in use to the operator so that information as to whether the switching of the connection states by said switching unit causes a problem is provided to the operator.

9. An antenna switching control unit, comprising:
    an inputting unit manipulated by an operator for inputting instruction information for switching connection states through a switching unit; and
    a processor capable of providing, when said switching unit is to switch the connection states, an electric-wave reception state on said communication unit in use to the operator so that information as to whether the switching of the connection states by said switching unit causes a problem is provided to the operator.

10. A method performed by a processor of controlling a switching, comprising:
    inputting information for switching connection states;
    providing, when the connection states are to be switched, an electric-wave reception state on a communication unit in use to an operator; and
    determining whether the switching of the connection states causes a problem based on the provided state.

* * * * *